(12) United States Patent
Gupta et al.

(10) Patent No.: US 10,310,738 B2
(45) Date of Patent: Jun. 4, 2019

(54) AVOID OUT OF SPACE OUTAGE IN A THINLY PROVISIONED BOX

(71) Applicant: INTERNATIONAL BUSINESS MACHINES CORPORATION, Armonk, NY (US)

(72) Inventors: Lokesh Gupta, Tucson, AZ (US); Matthew G. Borlick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/651,094

(22) Filed: Jul. 17, 2017

(65) Prior Publication Data

US 2019/0018595 A1    Jan. 17, 2019

(51) Int. Cl.
*G06F 3/06*    (2006.01)

(52) U.S. Cl.
CPC .......... *G06F 3/0608* (2013.01); *G06F 3/0652* (2013.01); *G06F 3/0665* (2013.01)

(58) Field of Classification Search
CPC combination set(s) only.
See application file for complete search history.

(56) References Cited

U.S. PATENT DOCUMENTS

| | | | |
|---|---|---|---|
| 2007/0294206 A1 | 12/2007 | Korman et al. | |
| 2008/0126734 A1* | 5/2008 | Murase | G06F 3/0613 711/170 |
| 2010/0257306 A1* | 10/2010 | Kawaguchi | G06F 3/0616 711/103 |
| 2014/0006609 A1 | 1/2014 | Gay et al. | |
| 2014/0281330 A1 | 9/2014 | Baldwin et al. | |
| 2015/0261462 A1 | 9/2015 | Miwa et al. | |
| 2016/0139835 A1 | 5/2016 | Fiebrich-Kandler et al. | |

OTHER PUBLICATIONS

Mell et al., "The NIST Definition of Cloud Computing," National Institute of Standards and Technology, Sep. 2011, p. 1-3, Special Publication 800-145.

* cited by examiner

*Primary Examiner* — Yong J Choe
(74) *Attorney, Agent, or Firm* — Dmitry Paskalov

(57) ABSTRACT

A computer determines free space of the thinly provisioned box and calculates a time of consumption of the free space. The computer increases a dispatch and a priority of a clean-up job based on determination that the time of consumption is below a threshold time of consumption value. The increase of the dispatch is performed by deletion of dirty extents from the thinly provisioned box. The priority of the clean-up job represents a priority for execution of a cleaning program on the thinly provisioned box, where the clean-up job deletes the dirty extents from the thinly provisioned box. The computer executes the clean-up job before allocation of a new extent in the free space of the thinly provisioned box based on determination that the free space is below a critical level value, where the new extent may reduce the free space of the thinly provisioned box.

20 Claims, 5 Drawing Sheets

US 10,310,738 B2

AVOID OUT OF SPACE OUTAGE IN A THINLY PROVISIONED BOX

BACKGROUND

The present invention relates, generally, to the field of computing, and more particularly to space management in thinly provisioned boxes.

A box is a storage computing device that is typically attached to one or more storage devices and enables the autonomous handling and processing of input/output (I/O) requests, such as a storage controller, storage cluster, or storage server.

Thin provisioning is a method for allocating storage (blocks or other elements of storage capacity) using virtualization technology. Thin provisioning allows allocation of virtual volumes in a box so that the sum of all virtual volume capacities may logically exceed the physical space of the box.

SUMMARY

According to one embodiment, a method, computer system, and computer program product for managing a free space of a thinly provisioned box is provided. The present invention may include a computer that determines the free space of the thinly provisioned box and calculates a time of consumption of the free space. The computer increases a dispatch and a priority of a clean-up job based on determination that the time of consumption is below a threshold time of consumption value. The increase of the dispatch may be performed by deletion of dirty extents from the thinly provisioned box to increase the free space. The priority of the clean-up job may represent a priority for execution of a cleaning program on the thinly provisioned box, where the clean-up job may delete the dirty extents from the thinly provisioned box. The computer executes the clean-up job before allocation of a new extent in the free space of the thinly provisioned box based on determination that the free space is below a critical level value, in instances where the new extent may reduce the free space of the thinly provisioned box.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
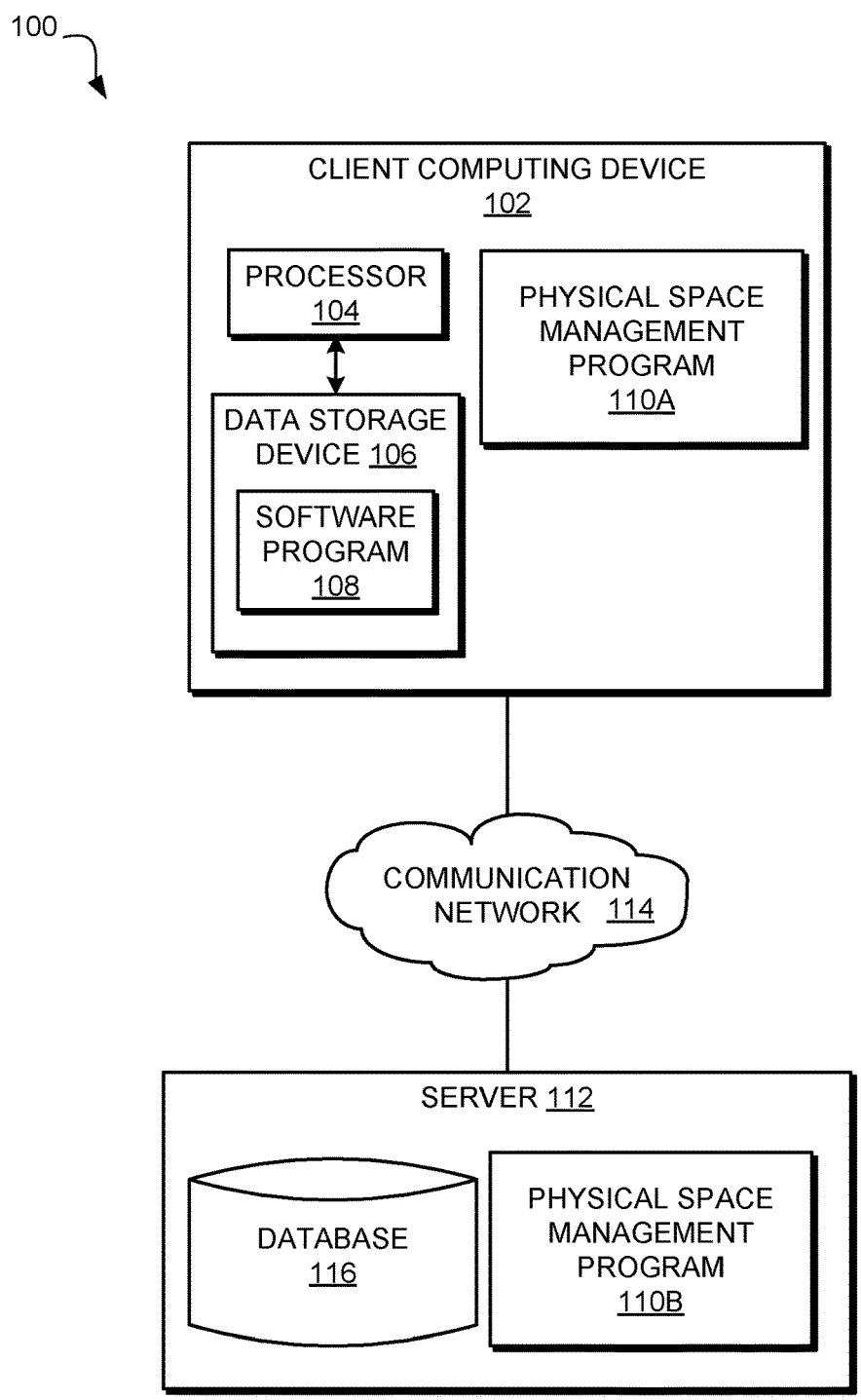
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to space management in thinly provisioned boxes. The following described exemplary embodiments provide a system, method, and program product to, among other things, predict the time when the box will run out of physical space, alert a user when the box reaches critical time value, and perform cleaning tasks based on the predicted time values. Therefore, the present embodiment has the capacity to improve the technical field of data storage and continuous operation of the thinly provisioned boxes by estimating the rate of physical memory consumption, timely alerting a user when the physical space is below a critical level and performing physical memory clean up procedures before allocating a physical space to any additional task whenever the free space is below a critical level in order provide a continuous operation of the thinly provisioned box.

As previously described, thin provisioning is a method for allocating storage (blocks or other elements of storage capacity) using virtualization technology. Thin provisioning allows allocation of virtual volumes in a box so that the sum of all virtual volume capacities may logically exceed the physical space of the box. Therefore, thin provisioning is one of the ways to cut costs and reduce the storage footprint of a box. Alternatively, thin provisioning boxes may be arranged in an Extent Space Efficient configuration (ESE) where extents (blocks of memory) are allocated as needed.

Typically, the allocation of physical capacity for ESE volumes occurs with writes to an unallocated address after writing it to cache of the box first. Before the write is destaged from cache to physical memory, a new extent is dynamically allocated and assigned to the volume. Whenever there are more writes then the physical capacity of the box then destaging (copying of the extent from the cache to the physical memory) would fail and no I/O would be allowed to the box until more physical space is added, such as an additional physical memory drive.

Adding, ordering, and installing an additional physical space may take considerable time. As such, it may be advantageous to, among other things, implement a system that may determine a rate of space consumption, alert a user when the physical space reaches critical levels and perform physical space cleaning procedures in order to allow the box to continue to operate for longer periods of time.

According to one embodiment, a physical space management program may determine the rates of free space consumption of the box and notify a user whenever the predicted free physical space will fall below user defined values. In addition, whenever the free space falls below the critical threshold value determined by a user, the physical space management program may initiate clean-up job procedures to clean the dirty extent in order to free more physical space for a continuous operation of the box. Dirty extents may be extents of a cache system that include dirty data and are written to the physical space of the box. Dirty data is cache data that has been modified but not yet rewritten to the physical space of the box, therefore dirty extents may be deleted from the physical space of the box to free the physical space of the box.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to calculate various values that represent box space consumption rates, determine a time when the box would run out of space based on consumption values, alert a user when space is running low, and perform a special cleaning procedure whenever the physical space is below critical values.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a physical space management (PSM) program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a box, laptop computer, netbook computer, personal computer (PC), a desktop computer, or any programmable electronic device or any network of programmable electronic devices capable of hosting and running a PSM program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the PSM program 110A, 110B may be a program capable of determining the rates of free space consumption, notifying a user when the free space is below user defined threshold values and schedule, prioritize and postpone new extent allocation before a clean-up job is performed to clean the box from dirty extents. The method of avoiding out of space outages in a thinly provisioned box is explained in further detail below with respect to FIG. 2.

Figure 2:
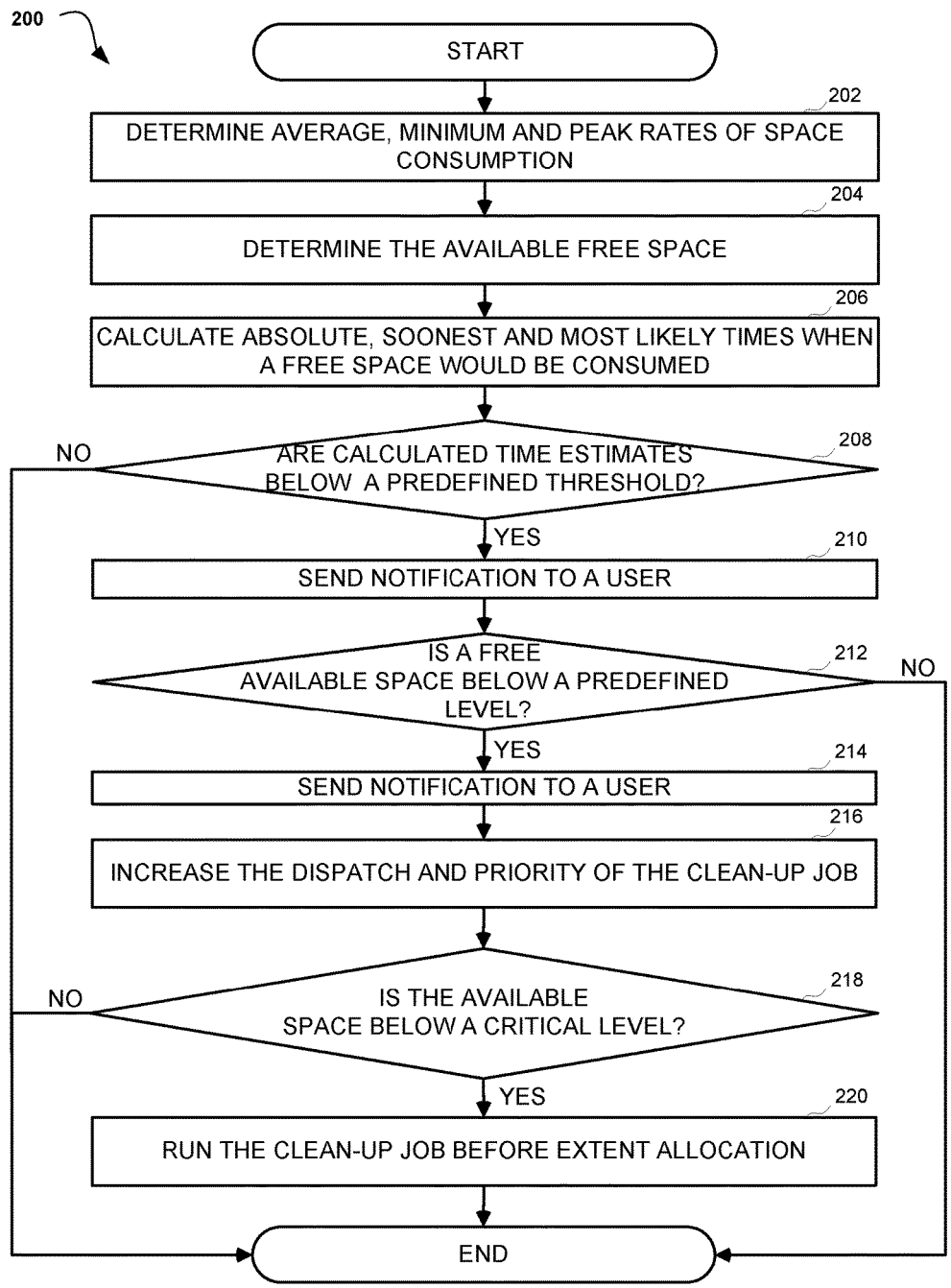
FIG. 2 is an operational flowchart illustrating a physical space management process according to at least one embodiment.

Referring now to FIG. 2, an operational flowchart illustrating a physical space management process 200 is depicted according to at least one embodiment. At 202, the PSM program 110A, 110B determines average, minimum and peak rates of space consumption. According to an embodiment of the present invention PSM program 110A, 110B may determine the rates of an available free space consumption on a timely basis. For example, PSM program 110A, 110B may calculate the consumption rates in the background every hour, day or other predetermined period of time. A PSM program 110A, 110B may determine average, minimum and maximum rates of the available free space consumption. An average of the available free space consumption may be determined by determining the number of extents allocated in the box at constant time frames, such as within an hour, and averaging the extents consumed before and during the current time frame. For example, if during a first hour 700 extents were allocated and during a next hour 600 extents were allocated then, PSM program 110A, 110B may determine that an average consumption rate is (700+600)/2, therefore 650 extents per hour. Respectively, the peak rate would be a highest value of extents consumed during a timeframe and the minimum rate would be the minimum value of extents consumed within a timeframe. To continue our previous example, the peak consumption rate would be 700 extents per hour and the minimum consumption rate would be 600 extents per hour.

Next, at 204, PSM program 110A, 110B determines the available free space. The available free space is a physical space in the box that is not occupied by data. According to an embodiment of the present invention PSM program 110A, 110B may determine the available free space by summarizing all the available physical spaces in the box and deducting the value representing the data currently occupied in cache memory of the box. According to an embodiment of the present invention, PSM program 110A, 110B may convert the available free space into units of extents by dividing the available free space by the average or actual spaces of the extents currently stored in the box.

Next, at 206, PSM program 110A, 110B calculates absolute, soonest and most likely times when free space would be fully consumed. The absolute, soonest, and most likely times when free space would be fully consumed are estimated times when the box would not be able to operate without an increase in physical free space by physically adding or increasing the storage capacity of the box. The absolute time estimate is based on a lowest rate of memory consumption, the soonest time estimate is based on the highest estimated rate of free space consumption, and the most likely estimate is based on an average rate of free space consumption. According to an embodiment of the present invention, PSM program 110A, 110B may calculate the absolute time left before the physical memory would be consumed by dividing the free available physical space by the minimum rate. Similarly, PSM program 110A, 110B may calculate the soonest time by dividing the available free space by the peak consumption rate. Additionally, PSM program 110A, 110B may calculate the most likely time by dividing the free available physical memory by the average consumption rate.

Then, at 208, the PSM program 110A, 110B determines whether any of the calculated times are below a predefined threshold. The predefined threshold is an estimated time set by a user in order to notify the user in advance that without an increase of the physical memory of the box the box may run out of free space. For example, if the predefined time threshold value is set to 720 hours (30 days) and one of the calculated times when a free space would be consumed is less than the predefined 720 hours, PSM program 110A, 110B may determine that there is less than the predefined time left. If the PSM program 110A, 110B determines that there is less than predefined time left (step 208, "YES" branch), the PSM program 110A, 110B may continue to step 210 to send notification to a user that the calculated time is below a predefined threshold. If the PSM program 110A, 110B determines that there is more than a predefined time left (step 208, "NO" branch), the PSM program 110A, 110B may terminate.

Next, at 210, PSM program 110A, 110B sends notification to a user. The notification may be a transmission sent by PSM program 110A, 110B that is displayed on a GUI of a user device. The user may be a direct user of the system, a supplier of the physical memory, a maintenance representative or any user that should be notified of critical space left in the box. According to an embodiment of the present invention, the notification sent by PSM program 110A, 110B may include the free space left and the time estimates as to when the available physical space will be consumed.

Then, at 212, the PSM program 110A, 110B determines whether an available free space is below a predefined level. The predefined space level is a critical physical space level threshold value set by a user. For example, if the predefined critical physical space level threshold value is set to 10 GB or 10 extents, and the current free physical space is below 10 GB or 10 extents, PSM program 110A, 110B determines that the available free space is below the predefined level. If the PSM program 110A, 110B determines that the free space available is below the predefined level (step 212, "YES" branch), the PSM program 110A, 110B may continue to step 214 to send notification to a user that the available free space is below a predefined level. If the PSM program 110A, 110B determines that the free space is above the predefined level (step 212, "NO" branch), the PSM program 110A, 110B may terminate.

Next, at 214, PSM program 110A, 110B sends notification to a user. The notification may be a transmission sent by PSM program 110A, 110B that is displayed on a GUI of a user device. The user may be a direct user of the system, a supplier of the physical memory, a maintenance representative or any user that should be notified of critical space left in the box. According to an embodiment of the present invention, the notification sent by PSM program 110A, 110B may include the free space left and the time estimates as to when the available physical space will be consumed. In another embodiment, the notification may be an automatic order of additional physical memory or an additional box.

Next, at 216, PSM program 110A, 110B increases the dispatch and priority of the clean-up job. According to an embodiment of the present invention, when the available free space is below a predefined level, PSM program 110A, 110B may increase the dispatch of dirty extents from physical memory and increase the priority of the extent cleaning program (clean-up job), such as by executing the clean-up job in a foreground and not in the background, or increase the priority and frequency of the clean-up job execution.

Then, at 218, the PSM program 110A, 110B determines whether the available space is below a critical level. The critical level is a critical available physical space threshold value that may affect the operation of the box due to lack of available free space. For example, if the predefined critical physical space level threshold value is set to 2 GB, or 2 extents, and the current free physical space is below 2 GB or 2 extents, PSM program 110A, 110B determines that the available space is below the critical level. If the PSM program 110A, 110B determines that the physical available space is below the critical level (step 218, "YES" branch), the PSM program 110A, 110B may continue to step 220 to run the clean-up job and free space before each new extent allocation. If the PSM program 110A, 110B determines that that the physical available space is not below the critical level (step 218, "NO" branch), the PSM program 110A, 110B may terminate.

Next, at 220, PSM program 110A, 110B runs the clean-up job before extent allocation. As previously mentioned, the PSM program 110A, 110B may initiate clean-up job procedures to clean the dirty extents and free more physical space for a continuous operation of the box. According to an embodiment of the present invention, PSM program 110A, 110B may monitor extent allocation requests by any of the requesting tasks and postpone extent allocation until the clean-up job (dirty extent cleaning program) frees the same amount of free space as requested by the requesting task.

It may be appreciated that FIG. 2 provides only an illustration of one implementation and does not imply any limitations with regard to how different embodiments may be implemented. Many modifications to the depicted environments may be made based on design and implementation requirements.

Figure 3:
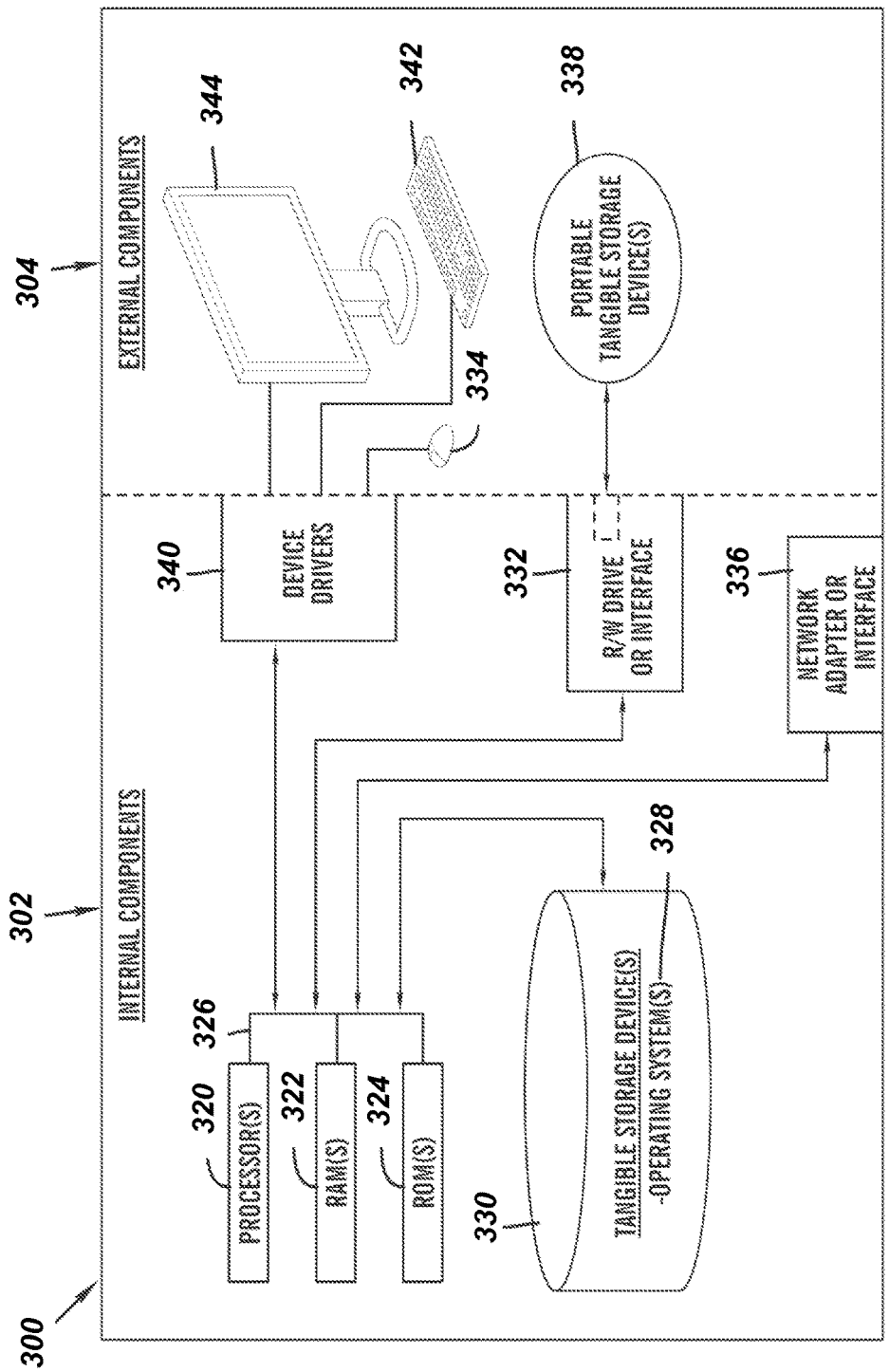
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the PSM program 110A in the client computing device 102, and the PSM program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 *a,b* also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the cognitive screen protection program 110A, 110B, can be stored on one or more of the respective portable computer-readable tangible storage devices 338, read via the respective R/W drive or interface 332, and loaded into the respective hard drive 330.

Each set of internal components 302 *a,b* also includes network adapters or interfaces 336 such as a TCP/IP adapter cards, wireless Wi-Fi interface cards, or 3G or 4G wireless interface cards or other wired or wireless communication links. The software program 108 and the PSM program 110A in the client computing device 102 and the PSM program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the PSM program 110A in the client computing device 102 and the PSM program 110B in the server 112 are loaded into the respective hard drive 330. The network may comprise copper wires, optical fibers, wireless transmission, routers, firewalls, switches, gateway computers and/or edge servers.

Each of the sets of external components 304 *a,b* can include a computer display monitor 344, a keyboard 342, and a computer mouse 334. External components 304 *a,b* can also include touch screens, virtual keyboards, touch pads, pointing devices, and other human interface devices. Each of the sets of internal components 302 *a,b* also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
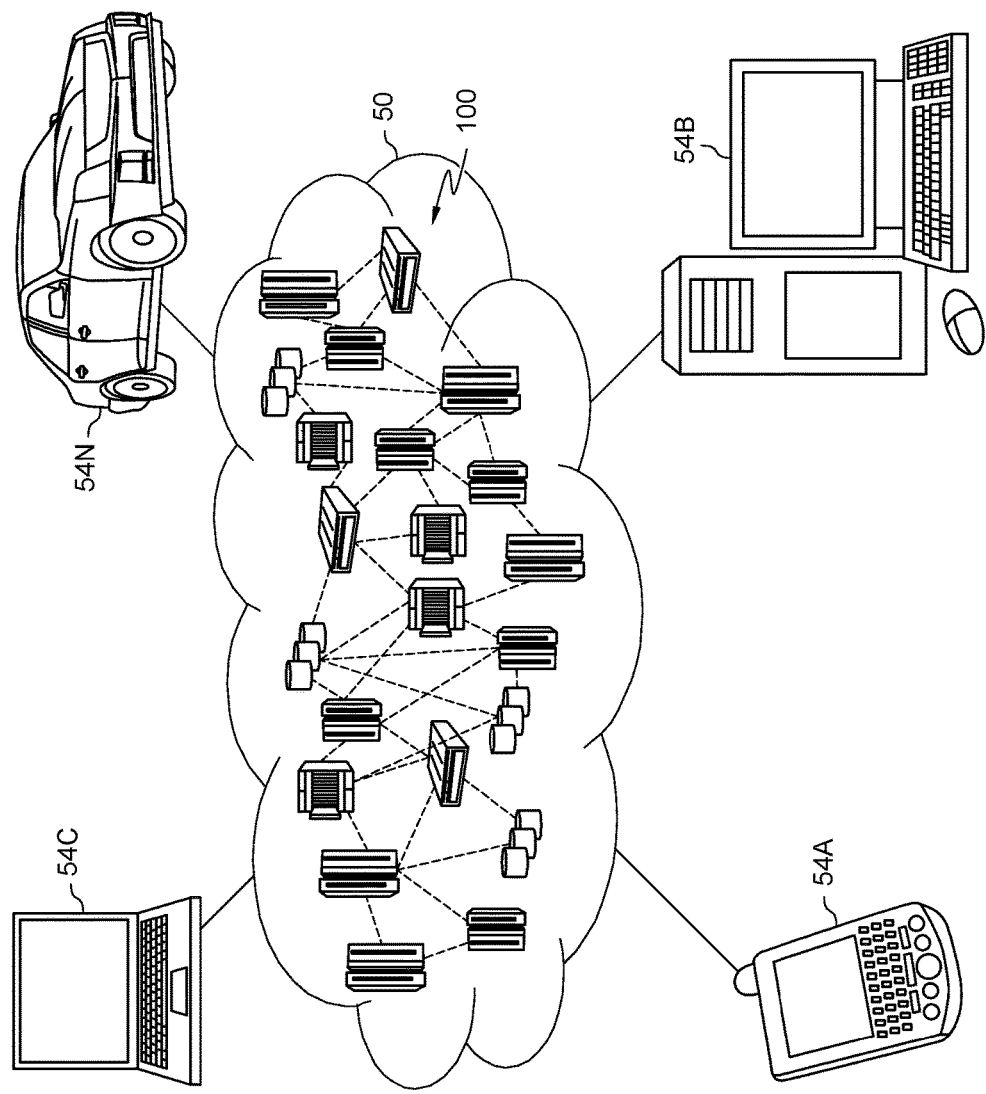
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
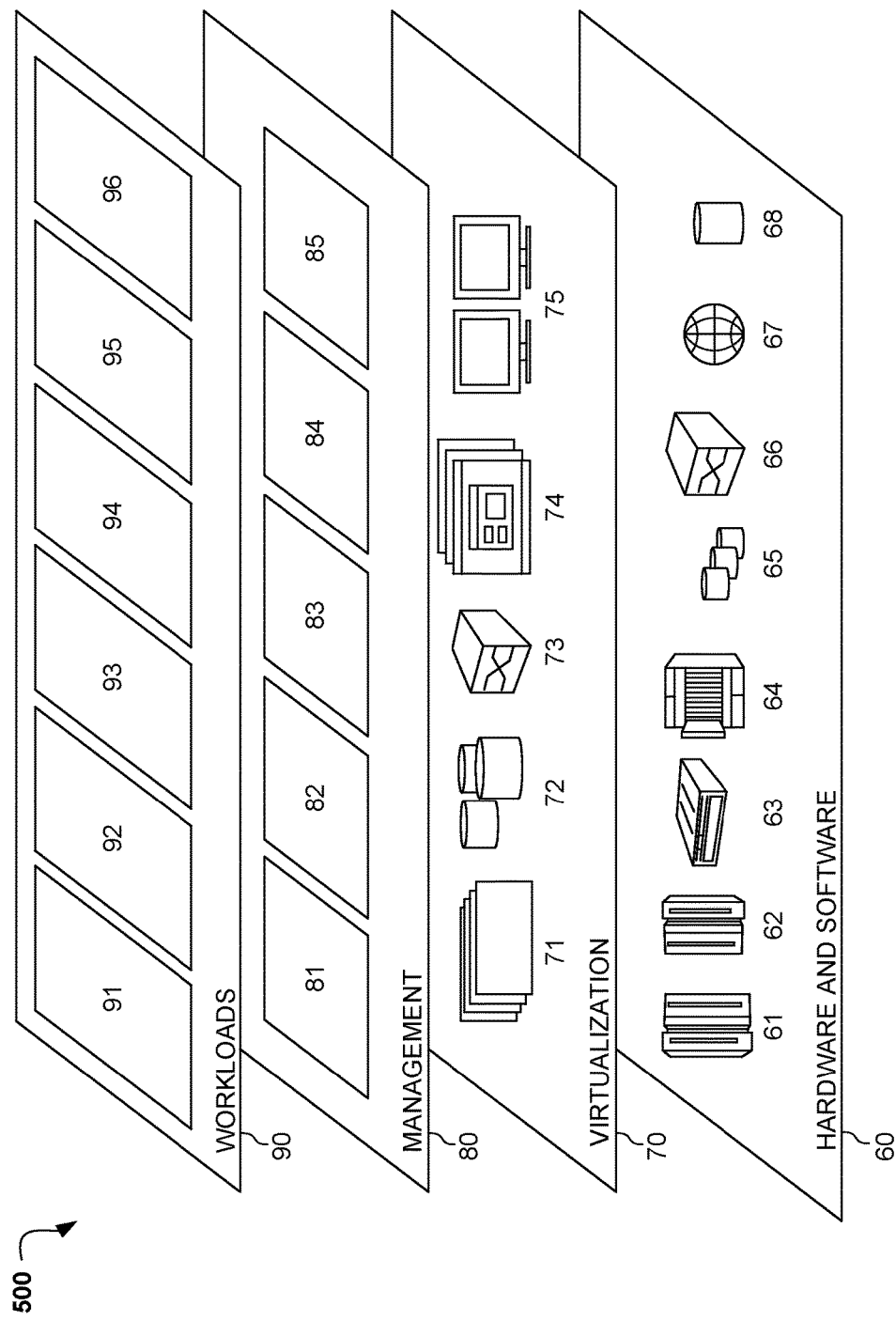
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and physical space management 96. Physical space management 96 may relate to analyzing free space consumption, alerting the user whenever the free space is below user defined thresholds and performing clean-up procedures to prevent the box running out of free physical space.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for managing a plurality of free space in
   a thinly provisioned box, the method comprising:
   determining a rate of consumption of the thinly provisioned box;
   determining the plurality of free space of the thinly provisioned box;
   calculating a time of consumption of the plurality of free space;
   based on determining that the time of consumption is below a threshold time of consumption value, increasing a dispatch and increasing a priority of a clean-up job, wherein increasing the dispatch deletes a plurality of dirty extents from the thinly provisioned box to increase the determined plurality of free space, wherein the priority of the clean-up job represents a priority for execution of a cleaning program on the thinly provisioned box, and wherein the clean-up job deletes the plurality of dirty extents from the thinly provisioned box to increase the plurality of free space; and
   based on determining the plurality of free space is below a critical level value, executing the clean-up job before allocating a new extent in the plurality of free space of the thinly provisioned box, wherein the new extent reduces the plurality of free space of the thinly provisioned box.

2. The method of claim 1, wherein determining the rate of consumption comprises:
   determining an average rate of consumption of the plurality of free space of the thinly provisioned box;
   determining a minimum rate of consumption of the plurality of free space of the thinly provisioned box; and
   determining a peak rate of consumption of the plurality of free space of the thinly provisioned box.

3. The method of claim 2, further comprising:
   calculating a most likely time of consumption based on the average rate of consumption and the plurality of free space of the thinly provisioned box;

calculating a soonest time of consumption based on the peak rate of consumption and the plurality of free space of the thinly provisioned box; and calculating an absolute time of consumption based on the minimum rate of consumption and the plurality of free space of the thinly provisioned box.

4. The method of claim 3, wherein determining that the time of consumption is below a threshold time of consumption value further comprises:

based on determining the most likely time of consumption is below the threshold time of consumption, sending a notification to a user;

based on determining the soonest time of consumption is below the threshold time of consumption, sending the notification to the user; and based on determining the absolute time of consumption is below the threshold time of consumption, sending the notification to the user.

5. The method of claim 1, wherein the thinly provisioned box is arranged in an Extent Space Efficient configuration allowing a plurality of extents to be allocated in the plurality of free space.

6. The method of claim 1, wherein increasing a priority of a clean-up job comprises switching a mode of execution of the clean-up job from a background to a foreground.

7. The method of claim 1, wherein executing the clean-up job before allocating a new extent in the plurality of free space of the thinly provisioned box comprises suspending an allocation of the new extent until deleting a dirty extent from the thinly provisioned box by the clean-up job is successful.

8. A computer system for managing a plurality of free space in a thinly provisioned box, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

determining a rate of consumption of the thinly provisioned box;

determining the plurality of free space of the thinly provisioned box;

calculating a time of consumption of the plurality of free space;

based on determining that the time of consumption is below a threshold time of consumption value, increasing a dispatch and increasing a priority of a clean-up job, wherein increasing the dispatch deletes a plurality of dirty extents from the thinly provisioned box to increase the determined plurality of free space, wherein the priority of the clean-up job represents a priority for execution of a cleaning program on the thinly provisioned box, and wherein the clean-up job deletes the plurality of dirty extents from the thinly provisioned box to increase the plurality of free space; and based on determining the plurality of free space is below a critical level value, executing the clean-up job before allocating a new extent in the plurality of free space of the thinly provisioned box, wherein the new extent reduces the plurality of free space of the thinly provisioned box.

9. The computer system of claim 8, wherein determining the rate of consumption comprises:

determining an average rate of consumption of the plurality of free space of the thinly provisioned box;

determining a minimum rate of consumption of the plurality of free space of the thinly provisioned box; and determining a peak rate of consumption of the plurality of free space of the thinly provisioned box.

10. The computer system of claim 9, further comprising:

calculating a most likely time of consumption based on the average rate of consumption and the plurality of free space of the thinly provisioned box;

calculating a soonest time of consumption based on the peak rate of consumption and the plurality of free space of the thinly provisioned box; and calculating an absolute time of consumption based on the minimum rate of consumption and the plurality of free space of the thinly provisioned box.

11. The computer system of claim 10, wherein determining that the time of consumption is below a threshold time of consumption value further comprises:

based on determining the most likely time of consumption is below the threshold time of consumption, sending a notification to a user;

based on determining the soonest time of consumption is below the threshold time of consumption, sending the notification to the user; and based on determining the absolute time of consumption is below the threshold time of consumption, sending the notification to the user.

12. The computer system of claim 8, wherein the thinly provisioned box is arranged in an Extent Space Efficient configuration allowing a plurality of extents to be allocated in the plurality of free space.

13. The computer system of claim 8, wherein increasing a priority of a clean-up job comprises switching a mode of execution of the clean-up job from a background to a foreground.

14. The computer system of claim 8, wherein executing the clean-up job before allocating a new extent in the plurality of free space of the thinly provisioned box comprises suspending an allocation of the new extent until deleting a dirty extent from the thinly provisioned box by the clean-up job is successful.

15. A non-transitory computer program product for managing a plurality of free space in a thinly provisioned box, the computer program product comprising:

one or more non-transitory computer-readable tangible storage medium and program instructions stored on at least one of the one or more tangible storage medium, the program instructions executable by a processor, the program instructions comprising:

program instructions to determine a rate of consumption of the thinly provisioned box;

program instructions to determine the plurality of free space of the thinly provisioned box;

program instructions to calculate a time of consumption of the plurality of free space;

based on determining that the time of consumption is below a threshold time of consumption value, program instructions to increase a dispatch and program instructions to increase a priority of a clean-up job, wherein increasing the dispatch deletes a plurality of dirty extents from the thinly provisioned box to increase the determined plurality of free space, wherein the priority of the clean-up job represents a priority for execution of a cleaning program on the thinly provisioned box, and wherein the clean-up job deletes the plurality of dirty extents from the thinly provisioned box to increase the plurality of free space; and based on determining the plurality of free space is below a critical level value, program instructions to execute the clean-up job before allocating a new extent in the plurality of free space of the thinly provisioned box, wherein the new extent reduces the plurality of free space of the thinly provisioned box.

16. The computer program product of claim 15, wherein program instructions to determine the rate of consumption comprises:

program instructions to determine an average rate of consumption of the plurality of free space of the thinly provisioned box;

program instructions to determine a minimum rate of consumption of the plurality of free space of the thinly provisioned box; and program instructions to determine a peak rate of consumption of the plurality of free space of the thinly provisioned box.

17. The computer program product of claim 16, further comprising:

program instructions to calculate a most likely time of consumption based on the average rate of consumption and the plurality of free space of the thinly provisioned box;

program instructions to calculate a soonest time of consumption based on the peak rate of consumption and the plurality of free space of the thinly provisioned box; and program instructions to calculate an absolute time of consumption based on the minimum rate of consumption and the plurality of free space of the thinly provisioned box.

18. The computer program product of claim 17, wherein program instructions to determine that the time of consumption is below a threshold time of consumption value further comprises:

based on determining the most likely time of consumption is below the threshold time of consumption, program instructions to send a notification to a user;

based on determining the soonest time of consumption is below the threshold time of consumption, program instructions to send the notification to the user; and based on determining the absolute time of consumption is below the threshold time of consumption, program instructions to send the notification to the user.

19. The computer program product of claim 15, wherein the thinly provisioned box is arranged in an Extent Space Efficient configuration allowing a plurality of extents to be allocated in the plurality of free space.

20. The computer program product of claim 15, wherein program instructions to increase a priority of a clean-up job comprises program instructions to switch a mode of execution of the clean-up job from a background to a foreground.

* * * * *